United States Patent Office 3,265,215
Patented August 9, 1966

3,265,215
GEL FILTRATION APPARATUS
Nils Ingvar Arne Emneus, Uppsala, and Per Gustaf Magnus Flodin, Perstorp, Sweden, assignors to Pharmacia Fine Chemicals Inc., New York, N.Y., a corporation of New York
Filed Apr. 11, 1963, Ser. No. 272,375
3 Claims. (Cl. 210—287)

This invention generally pertains to an apparatus for gel filtration. In particular the present invention relates to an apparatus for gel filtration which permits semi-automatic operation.

Gel filtration has up to now been largely performed on a laboratory scale by a cyclic procedure which involves loading the sample followed by elution with collection of the separated substances. If a sufficient number of consecutive gel filtrations are performed with the cycle time for each gel filtration reasonably constant, one will find that the gel bed is compressed, the compression being largest during the first gel filtration cycles and then gradually diminishing. Usually the comprission ceases rather quickly and the bed then comes into equilibrium with the forces acting upon it. However, even after this state has been reached the bed will be somewhat compressed and expanded in a regular manner during each cycle depending on variations in load. For gel filtration of large sample volumes one naturally wants to have the gel filtration column running with full use of its capacity. Therefore an uninterrupted operation throughout twenty-four hours is necessary, and consequently an automatization of the gel filtration process has been sought by the workers in the art.

The conditions for automatization seem to be favorable for a gel bed in equilibrium conditions in a column for the following reasons:

(1) All solutes can be eluated without change of eluant,
(2) The bed is therefore regenerated during the experiment and a new separation can be started as soon as the slowest solute has left the column or even earlier,
(3) High reproducibility of the gel filtration.

The equipment for gel filtration must, however, be adapted to automatization, and in this connection it has been obvious that the loading of the sample and the first stage of the elution before the sample has been drained into the bed are the most critical points of the automatization which have been most difficult to solve.

The present invention has solved these difficulties and enables the gel filtration process to be easily automated.

The present invention involves a modified procedure for gel filtration in a column. The new procedure mainly differs from the hitherto existing procedure insofar as the manner of loading the sample and introducing the eluant into the column is concerned.

Referring now to the drawings.

Figure 1:
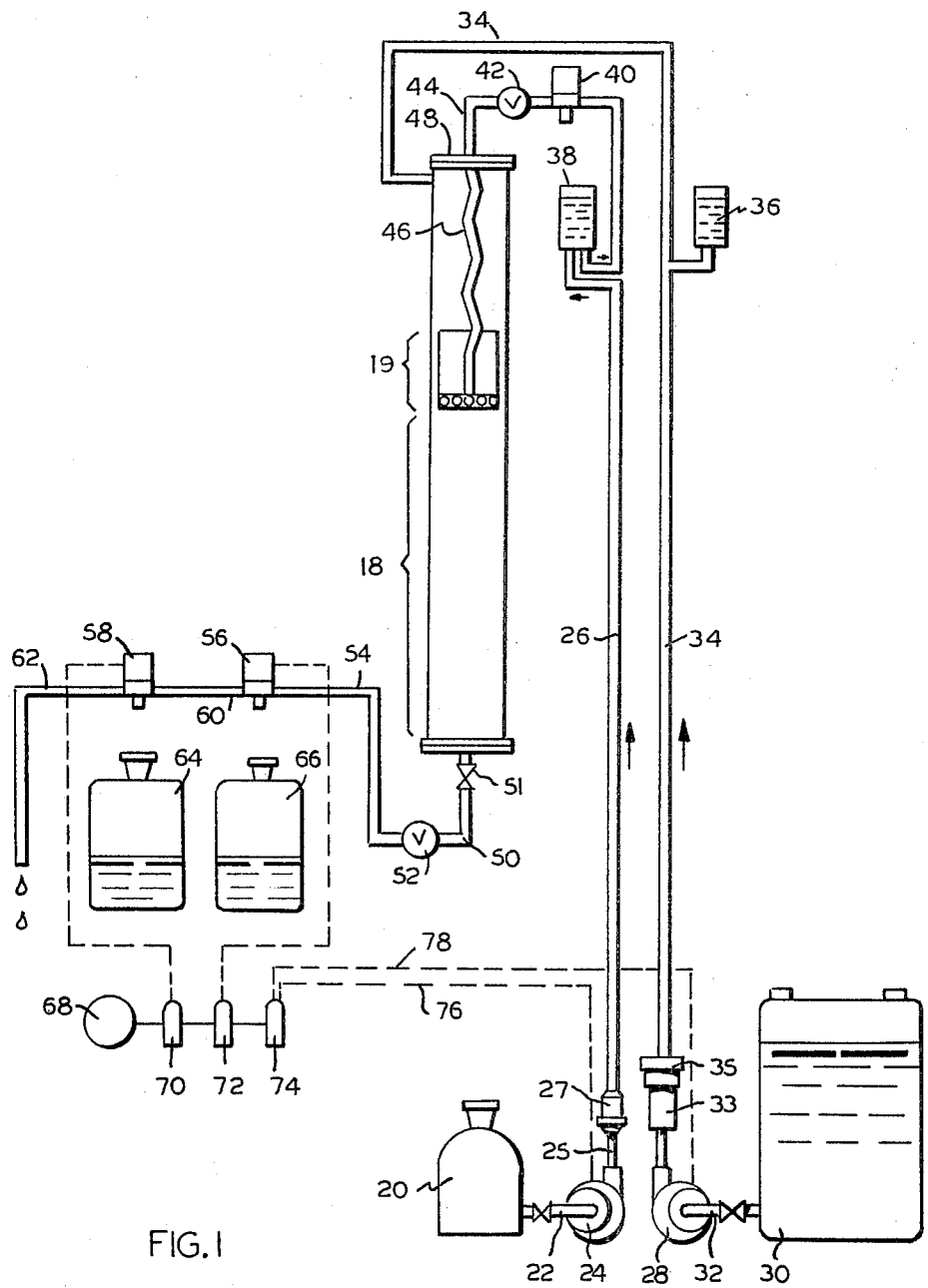
FIGURE 1 is an overall schematic drawing of a gel filtration arrangement useful in illustrating the novelty of the present invention.

FIGURE 1 is an overall schematic drawing of a gel filtration arrangement useful in illustrating the novelty of the present invention. In this arrangement a graduated sample container 20 is connected by means of conduit 22 to a sample feed pump 24. The output of pump 24 passes through conduit 25, a filter means 27 (e.g. having a ceramic disc), through conduit 26 to a 2-way-solenoid valve 40 which is closed when pump 24 is not operating. When valve 40 is opened flow is then permitted through valve 42 (when it is open) and conduit 44, through the top 48 of the filtration column. A rather flexible conduit 46 connects conduit 44 with the sample distributor (indicated by bracket 19) of the apparatus which will be described in greater detail hereinafter. The bracket 18 generally represents the location of the gel bed within the column.

An eluant container 30 is connected to an eluant feed pump 28 by means of a conduit 32. Conduits 33 and 34 connect the pump 28 to the top of the filtration unit and 35 represents a filter candle of the standard type. At the lower (exit) end of the column below gel bed 18 there is provided a conduit 50, valves 51 and 52, and a conduit 54. Conduit 54 is connected to a 3-way solenoid valve 56 and then to a 3-way solenoid valve 58 by means of a conduit extension 60. On the outlet side of solenoid valve 58 there is an outlet (or waste liquid) conduit 62. The 3-way solenoid valves 56 and 58 are in series and are used for collection of fractions from the filtration column. Although only two such valves have been shown, as many valves can be used as there are fractions to be collected in each gel filtration cycle. A fraction is collected through a valve as long as it is energized.

A timer 68, and more particularly a conventional cyclic timer with a cam-shaft driven by a synchronous motor with a gear transmission is shown. By properly selecting or changing the gears the cycle time may be varied. For the unit illustrated three pairs of cams are required. One pair 74 operates (a) the pumps 24 and 28, which are switched in alternately, and (b) the valve 40 at the same time as pump 24. The other two cams 70 and 72 operate the valves 58 and 56 respectively.

Numerals 36 and 38 represent air trap and pulsation-damping containers which may be used if desired.

Figure 2:
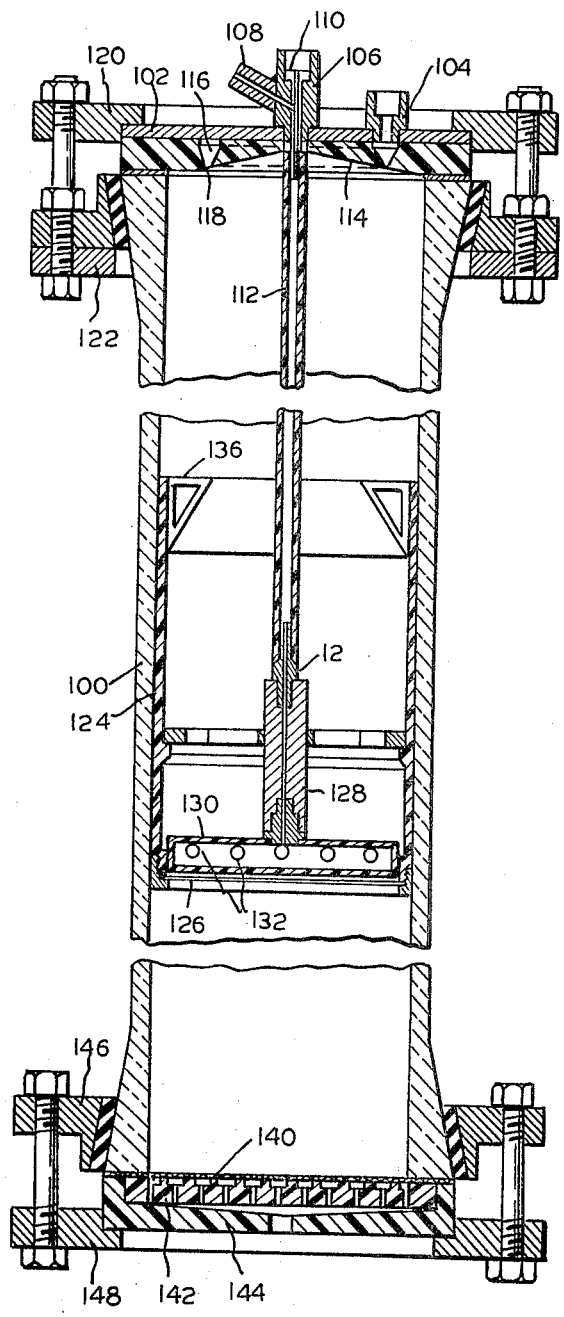
FIGURE 2 is an enlarged cross-sectional view of a gel filtration column in accordance with this invention.

FIGURE 2 is an enlarged and more detailed drawing of the filtration column shown in FIGURE 1. The exterior walls 100 of the column may consist of standard borosilicate glass tubing (for instance, Jena Duran glass #50). This glass tube may have the standard flanges and the height of the tube may be varied. A top cover is provided for the column. This preferably consists of two main parts. The upper part 102 of the cover may be made of stainless steel or polyvinyl chloride and has an off-center inlet 104 for the eluant. The inlet 104 may consist of a nylon nippel to which polyethylene tubing may be readily joined. There is also provided a center inlet 106 for introducing the sample. This inlet 106 may also consist of a nylon nipple which is well adapted to receive polyethylene tubing so as to give a snug fit. A side inlet 108 is provided for connection to a manometer so as to determine the pressure in the top of the column. A two-part hose arrangement 110 and 112 hangs freely from the center inlet 106 as is shown.

The lower part 114 of the top cover essentially consists of a ring-shaped eluant distributor, preferably made of plexiglass. Member 114 is preferably provided with a ring-shaped channel 116 so that the eluant (introduced through inlet 104) will be distributed downwardly in a uniform manner into the top of the column. A plurality of small holes 118 are located in the bottom of the ring-shaped channel 116.

The entire top cover for the column may be easily held in place by cooperating flange members 120 and 122.

Figure 3:
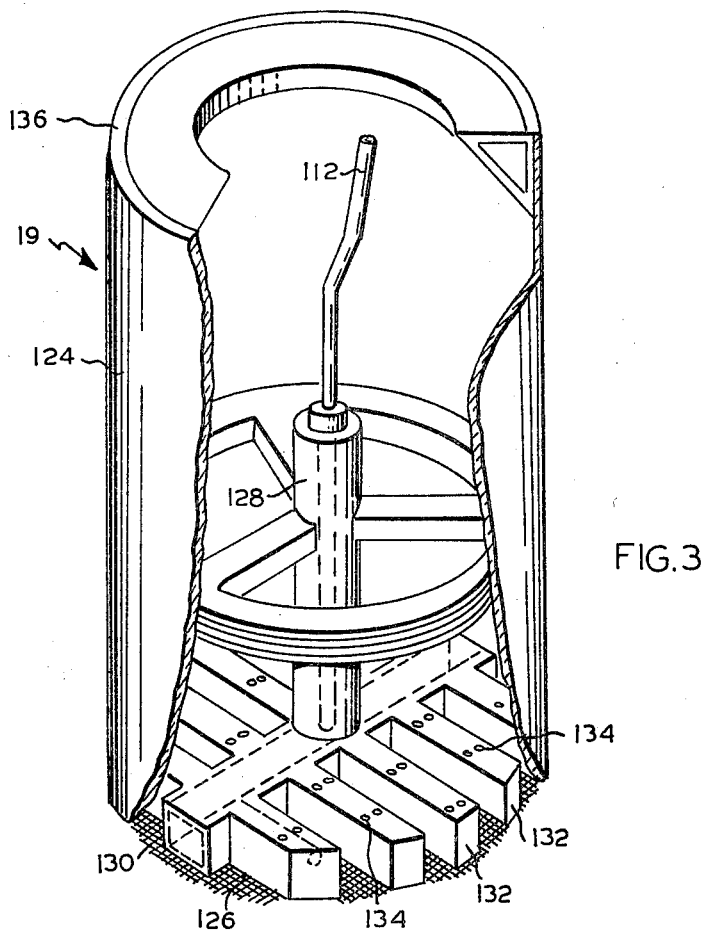
FIGURE 3 is a partially broken away perspective view of a distributor in accordance with this invention.

FIGURES 2 and 3 further illustrate in detail the sample distributor 19 which is only generally shown in FIGURE 1. The distributor 19 will be seen to consist of an outer housing member or a plastic cylinder 124 (which has an external diameter slightly less than the internal diameter of the glass tube 100). A stainless steel network or screen 126 defines the bottom of the distributor. Disposed axially within the distributor 19 is a central tube 128 which has its upper end connected to the lower end of hose or flexible tube 112. The lower portion of the central tube 128 opens into a network of laterally extending tubes or channels consisting of a main header tube 130 and a plurality of feeder channels 132. The bottoms of the tubes or channels 130 and 132 are located immediately above the top surface of the screen 126. It will be seen that the upper portions of the laterally extending channels 132 are provided with a plurality of holes or openings. Thus, liquid flowing downwardly through flexible hose 112 will pass through central tube 128, header tube 130 and then outwardly through lateral channels 132 and then out through the holes 134. Preferably the holes or outlets 134 are spaced at a constant distance from each other and are all situated on the same level. The diameters of the holes 134 must be sufficiently large so that the introduced liquid sample just flows over the edges and does not "jet" because jet streams would cause undesirable turbulence and mixing with the eluant. Most preferably the distance between adjacent holes on adjacent channels is the side of an equilateral triangle.

The net or screen 126 is preferably a stainless steel screen of 12–300 mesh, depending on the gel type used in the column. Alternatively, a porous plastic or metallic plate might be used in place of the screen or network 126. An essential feature of the distributor is that it does not leak after the dosage of the sample.

If properly levelled, the distributor pipe block cannot leak because the outflow holes are turned upwards and the highest point of the central tube is slightly lower than the outflow level of the side tubes.

The vertical inlet tube 12 of the distributor is connected to the hose connection tube 110 in the cover with a piece of thick-walled but flexible plastic tubing 112 long enough to allow the distributor always to rest on the gel bed. Just outside the column the sample feed polyethylene tubing is connected to the 3-way valve 42 necessary for expelling air from the sample feed tubings before operation is started.

While the precise arrangement of tubes, channels and outlets (130, 132 and 134) shown in FIGURES 2 and 3 have been found to be quite useful, other specific variations on this basic idea are of course possible. For example, we have used another type of arrangement which has open side channels and triangular overflow points or weirs. We have also used similar arrangements with removable top portions, which are easier to clean and easier to fill with eluant than the closed type.

The distributor also is preferably provided with a float 136. This float may simply consist of a circular hollow member pressed downwardly within the top of the housing member 124 so as to fit snuggly and be firmly retained therein. The purpose of the float is to make the assembled sample distributor with its connective tubing almost weightless in the eluant. However, the distributor assembly should always have enough weight to sink slowly in the eluant and rest immediately above the gel bed.

With regard to the bottom of the gel filtration column, the gel bed rests upon a network of screen 140 which is supported by a perforated plastic plate 142 which fits into the bowl-shaped bottom 144 of the column. The bottom 144 as well as the perforated plate 142 and the net 140 are held in place by flange members 146 and 148. It will be noted that the bowl shape of the bottom 144 results in a very small drainage chamber, which is desirable in order to avoid mixing of the effluent. The screen 140 may be 300 mesh stainless steel.

PREPARING THE COLUMN FOR OPERATION

The filtration column is first packed with gel. There are a number of ways in which this may be done. According to one simple method the column is carefully mounted vertically and the bottom outlet to the column is closed. The column is then filled to one third with water or buffer and glass wool and glass beads are then put in place in the bottom of the column. Glass wood and glass beads function to prevent loose gels from being squeezed through the bottom net or plate, and when the gels are large enough and hard enough that this danger does not exist the glass wool and glass beads may be omitted. An extension tube is connected. The column and tube is then filled with the gel suspension which immediately starts to sediment. When a layer of 2–5 cm. has formed the outlet is opened and a slow stream of water allowed to flow out. A horizontal zone of packed material soon becomes visible and allows visual control of the process. If the zone becomes skew the packing should be interrupted. As soon as the extension tube is devoid of gel the supernatant is removed and more suspension added. This is repeated until the desired bed depth has been obtained. It is essential that new suspension is added before all gel previously present has packed.

After packing, the extension tube is removed and the top layer of the bed stirred up. The column is then assembled and the gel bed is washed by eluant through the bed until the bed is stable. At least 3–5 bed volumes should be used. The bed surface is further stabilized by the net of the sample distributor.

The assembled sample distributor 19 with its connective tubing is immersed into a bucket with water. By swirling around the distributor or if necessary gently knocking the distributor, air bubbles trapped in the associated tubing and conduits will escape. The plastic tubing 112 is then closed by a hose clamp and the distributor is carefully transferred to the column.

The packed column should be almost filled with water and the distributor allowed to sink down to the top of the gel bed. The hose clamp of the connective tubing 112 is then removed, and tubing 112 is connected to the hose connection tube 110 in the top cover of the column.

After the cover has been assembled on the column, eluant is pumped into the column with the bottom valve 51 closed. When a sufficient overpressure has been obtained in the top of the column the 3-way sample feed valve 42 is opened to the atmosphere and any air bubbles in the vertical conduits 44 or 46 (112) down to the distributor 19 will readily escape.

For trapping air bubbles in the discharge pipe of the sample feed pump and for damping its pulsations a small container 38 partly filled with the eluant and with inlet and outlet at the bottom is connected with the discharge tubings in series. However, it can be valved in or out of the system if desired.

The sample solution is now pumped from the sample container 20 and out through the 3-way valve 42 until all air bubbles have escaped. The valve 42 is then closed and the pump 24 stopped. The valve 42 is then turned to connect the two deaerated parts (26 and 44) of the sample feed line and then the column is ready for operation.

THE GEL FILTRATION OPERATION

After the gel filtration column has been partly filled with gel, the space above the gel bed is filled with the eluant completely or at least to an extent permitting the distributor to float over the gel bed surface. The sample is then gently layered at the interface between the gel and the eluant with the aid of the special distributor device of this invention. The distributor rests on the gel bed and follows the movements without compressing the bed. The primary purpose of the distributor is to distribute the sample as fast and as uniformly as possible over the gel bed surface but with a minimum dilution of the sample with the eluant. A prerequisite condition for the use of this manner of loading the sample is, of course, that the density of the sample be higher than that of the eluant. The eluant is then fed to the column in such a manner that the sample applied at the interface between the gel and the eluant is not disturbed by the subsequent feeding of the eluant into the column.

Figure 4:
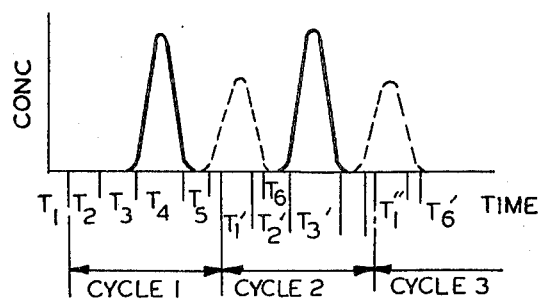
FIGURE 4 is a graph indicating a programming procedure for a gel filtration process in accordance with this invention.

The method for programming the gel filtration unit is illustrated in FIGURE 4. At time $T_1$ the sample pump 20 starts to add sample to the column. When a suitable volume (time $T_2$) has been added the cam 74 switches off pump 24 and starts pump 28. Until time $T_3$ the effluent goes to waste and then the solenoid valve 56 is actuated through the cam 72 and the fast component collected. At $T_4$ the valve 56 is closed and the effluent goes to the waste until $T_5$ when the valve 58 is actuated by cam 70. Solenoid 58 is open to time $T_6$. In the meantime the cam-shaft has completed one revolution and the cam 74 starts the addition of a new sample. The time for the second and subsequent cycles is shorter than the time for a complete gel filtration experiment (first cycle) due to the fact that the void volume can be overlapped into a previous cycle.

In order to ascertain the program scheme a test elution curve is first made. For the first few cycles the bed changes in length but then reaches equilibrium, after which the program can be adjusted so that the unit operates without attention for long periods.

The separation capacity depends on the cycle time, which should be kept as low as possible. The possibility of maintaining a high flow rate for long periods of time is therefore of decisive importance. The particle size of the gel and the linear flow rate influence the pressure drop over the column. The limiting flow rate for any fraction is that point at which the pressure increases very rapidly.

The gel filtration column described is also well suited for ordinary gel filtration of a single sample. In this case the sample may also be added by gravity from a separation funnel thereby avoiding losses of sample in the feed tubings with accessories from the sample container to the sample distributor in the column.

In most such cases the column is operated by hand without using the timer to command the equipment of the column.

The process and apparatus of this invention may be used to carry out separation methods such as are disclosed in Flodin and Porath Patent 3,002,823.

In conclusion, while there has been illustrated and described a preferred embodiment of our invention, it is to be understood that since the various details of construction may obviously be varied considerably without really departing from the basic principles and teachings of this invention, we do not limit ourselves to the precise constructions herein disclosed and the right is specifically reserved to encompass all changes and modifications coming within the scope of the invention as defined in the appended claims.

What is claimed is:
1. A gel filtration apparatus, comprising in combination:
    (a) an elongated upright filtration column having a top cover and a bottom member,
    (b) said bottom member being perforated but adapted to support a bed of gel extending only a part of the way up the length of said column,
    (c) a sample distributor normally positioned within said column above said bed of gel,
    (d) said sample distributor having enough buoyancy so that it rests on the top of gel bed without compressing it and follows the movement of the gel bed,
    (e) an inlet for sample liquid in said top cover, said inlet being connected to said sample distributor by means of a conduit,
    (f) said sample distributor having a plurality of laterally extending sample liquid outlets located at spaced intervals across the cross sectional area of said column.
2. A sample distributor for gel filtration columns and the like comprising in combination:
    (a) an outer housing member with exterior dimensions slightly smaller than the interior dimensions of the column in which it is to operate,
    (b) a central tube positioned along the vertical axis of said outer housing member,
    (c) the upper end of said central tube being connected to a conduit which is adapted to supply sample liquid to said tube,
    (d) the lower end of said central tube being joined to a plurality of laterally extending liquid conduits which all lie in a plane perpendicular to the axis of said central tube,
    (e) openings in the upper surfaces of said liquid conduits which permit liquid to exit therefrom in a uniform manner at a plurality of points across the cross section of the column.
3. A sample distributor according to claim 2 which additionally contains a float member.

References Cited by the Examiner
UNITED STATES PATENTS

| | | | |
|---|---|---|---|
| 488,297 | 12/1892 | Thurston | 210—263 |
| 2,072,393 | 3/1937 | Briggs | 210—287 |
| 2,119,117 | 5/1938 | Schuller et al. | 210—66 |
| 2,223,663 | 12/1940 | Roberts et al. | 210—66 |

REUBEN FRIEDMAN, *Primary Examiner.*

S. ZAHARNA, *Assistant Examiner.*